(12) United States Patent
Ikenoya

(10) Patent No.: US 7,627,751 B2
(45) Date of Patent: Dec. 1, 2009

(54) INFORMATION PROCESSING APPARATUS, AN AUTHENTICATION APPARATUS, AND AN EXTERNAL APPARATUS

(75) Inventor: Kazuyuki Ikenoya, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 871 days.

(21) Appl. No.: 10/913,552

(22) Filed: Aug. 9, 2004

(65) Prior Publication Data

US 2005/0066163 A1 Mar. 24, 2005

(30) Foreign Application Priority Data

Aug. 11, 2003 (JP) .............................. 2003-291046

(51) Int. Cl.
*H04L 29/04* (2006.01)
*G06F 7/04* (2006.01)

(52) U.S. Cl. ......................................... 713/158; 726/10

(58) Field of Classification Search ................. 713/158; 726/10

See application file for complete search history.

(56) References Cited

U.S. PATENT DOCUMENTS

| | | | |
|---|---|---|---|
| 6,219,790 B1 * | 4/2001 | Lloyd et al. ................... 726/14 |
| 6,321,339 B1 * | 11/2001 | French et al. ................... 726/2 |
| 7,073,055 B1 * | 7/2006 | Freed et al. ................... 713/155 |
| 7,107,051 B1 * | 9/2006 | Walker ..................... 455/432.1 |
| 7,275,155 B1 * | 9/2007 | Aull ........................... 713/157 |
| 2002/0023208 A1 * | 2/2002 | Jancula ....................... 713/156 |
| 2002/0026590 A1 * | 2/2002 | Kusunoki ................... 713/201 |
| 2002/0078346 A1 | 6/2002 | Sandhu et al. |
| 2003/0115342 A1 * | 6/2003 | Lortz ......................... 709/229 |
| 2003/0163569 A1 * | 8/2003 | Panasyuk et al. ............ 709/227 |
| 2004/0143795 A1 | 7/2004 | Matsuishi |
| 2004/0148505 A1 * | 7/2004 | Qiu ............................. 713/175 |
| 2005/0120214 A1 * | 6/2005 | Yeates et al. ................. 713/171 |
| 2006/0047951 A1 * | 3/2006 | Reilly et al. ................. 713/158 |
| 2007/0234039 A1 * | 10/2007 | Aull ........................... 713/155 |

FOREIGN PATENT DOCUMENTS

| | | |
|---|---|---|
| JP | 2000-222360 | 8/2000 |
| JP | 2001-256355 | 9/2001 |
| JP | 2002-007344 | 1/2002 |

OTHER PUBLICATIONS

Hughes, Larry J., *Actually Useful Internet Security Techniques*, Part I, "Encryption and Authentication", Chapter 4, "The Kerberos Authentication System", New Riders Publishing, Indianapolis, Indiana, 1995, pp. 91-125.

* cited by examiner

*Primary Examiner*—Kambiz Zand
*Assistant Examiner*—Teshome Hailu
(74) *Attorney, Agent, or Firm*—Oblon, Spivak, McClelland, Maier & Neustadt, L.L.P.

(57) ABSTRACT

An information processing apparatus is disclosed that uses a function of an external apparatus using certificate information from an authentication apparatus for authenticating a user. The information processing apparatus includes: a receiving unit that receives authentication information for causing the authentication apparatus to authenticate the user; a first acquiring unit that acquires first certification information indicating that the user has been authenticated by sending the authentication information to the authentication apparatus; and a second acquiring unit that acquires second certification information for using a function of the external apparatus from the authentication apparatus based on the first certification information. It is possible to provide an information processing apparatus that, even if a certificate for using a service expires, can continue using the service without having the user notice the expiration.

31 Claims, 20 Drawing Sheets

FIG.8

| ID | MASTER TICKET | AUTHENTICATION SERVICE URL |
|---|---|---|
| | | |
| | | |

FIG.9

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance">
<soapenv:Body>
<ns1:authenticateByPassword        ~ 612
soapenv:encodingStyle="http://schemas.xmlsoap.org/soap/encoding/"
xmlns:ns1="http://www.xxxx">
<username xsi:type="xsd:string">aaa</username>     ~ 613
<password xsi:type="xsd:string">abc!</password>    ~ 614
<duration xsi:type="xsd:int">3600</duration>       ~ 615
</ns1:authenticateByPassword>
</soapenv:Body>
</soapenv:Envelope>
```

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema" xmlns:xsi="http://www.w3.org/2001/XMLSchema-
instance">
  <soapenv:Body>
    <ns1:authenticateByPasswordResponse
soapenv:encodingStyle="http://schemas.xmlsoap.org/soap/encoding/" xmlns:ns1="http://www.xxxx">
      <returnValue
xsi:type="xsd:base64Binary">AJjhIZEsUBze9Ssp1qiAWTNXg4SP8KXVghpV/hfxIdKNW/Xu/qZ8Nm4=</
returnValue>
    </ns1:authenticateByPasswordResponse>
  </soapenv:Body>
</soapenv:Envelope>
```

| ID | MASTER TICKET | AUTHENTICATION SERVICE URL |
|---|---|---|
| 001 | xxxxxxx | http://xxxxx/yyyy |
| | | |

| ID | USER NAME | PASSWORD | AUTHENTICATION SERVICE URL |
|---|---|---|---|
| 001 | aaa | abc | http://xxxxx/yyyy |
| | | | |

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema" xmlns:xsi="http://www.w3.org/2001/XMLSchema-
instance">
  <soapenv:Body>
    <ns1:createAuthTicket soapenv:encodingStyle="http://schemas.xmlsoap.org/soap/encoding/"
xmlns:ns1="http://www.xxxx">
      <masterAuthTicket
xsi:type="xsd:base64Binary">AJjhlZEsUBze9Ssp1qjAWTNXg4SP8KXVghpV/hfxldKNW/Xu/qZ8Nm4=</master
AuthTicket>
      <duration xsi:type="xsd:int">60</duration>
      <targets xsi:type="soapenc:Array" soapenc:arrayType="xsd:string[1]" xmlns:ns2="http://www.xxxx"
xmlns:soapenc="http://schemas.xmlsoap.org/soap/encoding/">
        <item>Repository</item>
      </targets>
    </ns1:createAuthTicket>
  </soapenv:Body>
</soapenv:Envelope>
```

```
<?xml version="1.0" encoding="UTF-8"?>
<soapenv:Envelope xmlns:soapenv="http://schemas.xmlsoap.org/soap/envelope/"
 xmlns:xsd="http://www.w3.org/2001/XMLSchema"
 xmlns:xsi="http://www.w3.org/2001/XMLSchema-instance">
<soapenv:Body>
 <ns1:createAuthTicketResponse
soapenv:encodingStyle="http://schemas.xmlsoap.org/soap/encoding/"
 xmlns:ns1="http://www.xxxx">
  <returnValue
xsi:type="xsd:base64Binary">AJjhlZEsUBzeySJ45pkTg6PimuLw/9IkBnA5uDAdz45X01K
Ry1oYlhEeh9bUTYg6UA==</returnValue>
 </ns1:createAuthTicketResponse>
</soapenv:Body>
</soapenv:Envelope>
```

```xml
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema" xmlns:xsi="http://www.w3.org/2001/XMLSchema-
instance">
<soapenv:Body>
<ns1:createAuthTicket soapenv:encodingStyle="http://schemas.xmlsoap.org/soap/encoding/"
xmlns:ns1="http://www.xxxx">
<masterAuthTicket
xsi:type="xsd:base64Binary">AJjhIZEsUBze9Ssp1qjAWTNXg4SP8KXVghpV/hfxIdKNW/Xu/qZ8Nm4=</
masterAuthTicket>
<duration xsi:type="xsd:int">60</duration>
<targets xsi:type="soapenc:Array" soapenc:arrayType="xsd:string[1]" xmlns:ns2="http://www.xxxx"
xmlns:soapenc="http://schemas.xmlsoap.org/soap/encoding/">
<item>Delivery</item>
</targets>
<options xsi:type="soapenc:Array" soapenc:arrayType="ns3:property[0]"
xmlns:ns3="http://www.xxxx" xmlns:soapenc="http://schemas.xmlsoap.org/soap/encoding/"/>
</ns1:createAuthTicket>
</soapenv:Body>
</soapenv:Envelope>
```

```
<?xml version="1.0" encoding="UTF-8"?>
<soapenv:Envelope xmlns:soapenv="http://schemas.xmlsoap.org/soap/envelope/"
xmlns:xsd="http://www.w3.org/2001/XMLSchema"
xmlns:xsi="http://www.w3.org/2001/XMLSchema-instance">
<soapenv:Body>
<ns1:createAuthTicketResponse
soapenv:encodingStyle="http://schemas.xmlsoap.org/soap/encoding/"
xmlns:ns1="http://www.xxxx">
<returnValue
xsi:type="xsd:base64Binary">AJjhIZEsUBze/XIoDP89aJo2hfb8XtR+lazy5mLHv/dkw5/5RBF/Jp0v
cOAIVrB5cQ==</returnValue>
</ns1:createAuthTicketResponse>
</soapenv:Body>
</soapenv:Envelope>
```
66

INFORMATION PROCESSING APPARATUS, AN AUTHENTICATION APPARATUS, AND AN EXTERNAL APPARATUS

BACKGROUND OF THE INVENTION

1. Field of the Invention

The present invention relates to an information processing apparatus that uses a service based on electronic certification information, an authentication apparatus that provides the certification information to the information processing apparatus, and an external apparatus that provides the service to the information processing apparatus.

2. Description of the Related Art

When a client accesses a server to receive a service via a network, the client is generally required to present authentication information such as a user name and a password. Such authentication information is required to prevent unauthorized users from accessing the server.

However, especially in the case of the Internet, it is not preferable that such authentication information is often transmitted through the network since many unnamed users may access the transmitted authentication information.

To avoid such a problem, an electronic certificate (hereinafter referred to as a "ticket"), instead of the authentication information, may be presented to the server. The ticket certifies that the user is authorized and has been authenticated.

The client first presents the user name and the password, for example, to an authentication server in which ticketing function is installed. The authentication server authenticates the client, and issues a ticket.

When the client presents the ticket to a particular server and requests for a service, the particular server requests the authentication server to verify the authenticity of the ticket. The particular server provides the client with the requested service subject to the verification of the authenticity of the ticket by the authentication server.

The ticket does not contain the authentication information such as the password. The ticket is valid for a validity period in which the client can use the service of the particular server. According to such arrangements, if the ticket is stolen, damage caused by the inauthentic use of the ticket would be less serious than inauthentic use of stolen password. The use of the ticket ensures to improve the security of the network.

"Single sign-on" technique has been already introduced in order to save user's time to input the user name and the password, for example. In the case of the single sign-on technique, when the user uses services of multiple servers, the user is required to input the user name and the password, for example, only once when the user has a ticket issued. Once the ticket is issued, the user can user the services of the multiple servers: by using the ticket, without inputting the user name and the password, for example.

However, as described above, the ticket is valid only for a validity period. When the ticket expires, the ticket is no more valid. The user cannot use a service of a server without a valid ticket.

The user needs to have another ticket issued in order to use the service of the server. The user needs to input the user name and the password, for example, again. The user may feel this troublesome.

SUMMARY OF THE INVENTION

Accordingly, it is a general object of the present invention to provide novel and useful information processing apparatus, authentication apparatus, and external apparatus in which at least one of the above problems is eliminated.

Another and more specific object of the present invention is to provide an information processing apparatus that, even if an electronic certificate for using a predetermined service has expired, can continue using the service without having the user notice the expiration, an authentication apparatus that provides the electronic certificate to the information processing apparatus, and an external apparatus that provides the information processing apparatus with the predetermined service.

To achieve at least one of the above objects, according to a first aspect of the present invention, an information processing apparatus that uses a function of an external apparatus using certificate information from an authentication apparatus for authenticating a user is characterized in that the information processing apparatus includes:

a receiving unit that receives authentication information for causing the authentication apparatus to authenticate the user;

a first acquiring unit that acquires first certification information indicating that the user has been authenticated by sending the authentication information to the authentication apparatus; and a second acquiring unit that acquires second certification information for using a function of the external apparatus from the authentication apparatus based on the first certification information.

According to a second aspect of the present invention, an authentication apparatus is characterized by including:

an authentication unit that receives authentication information for authenticating a user, the authentication information being sent via a network from the information processing apparatus as claimed in claim 1;

a first certification information generating unit that generates first certification information indicating that the user has been authenticated based on the authentication information; and a transmitting unit that transmits the first certification information generated by the first certification information generating unit to the information processing apparatus.

According to a third aspect of the present invention, an external apparatus is characterized by including:

a request receiving unit that receives via a network a request for providing a predetermined function, the request being transmitted with the second certification information from the information processing apparatus as claimed in claim 1; and a processing performing unit that performs processing related to the request for providing a predetermined function;

wherein the processing performing unit performs processing related to the request based on the second certification information.

According to the present invention, it is possible to provide an information processing apparatus that, even if an electronic certificate for using a predetermined service has expired, can continue using the service without having the user notice the expiration, an authentication apparatus that provides the electronic certificate to the information processing apparatus, and an external apparatus that provides the information processing apparatus with the predetermined service.

Other objects, features, and advantages of the present invention will become more apparent from the following detailed description when read in conjunction with the accompanying drawings.

BRIEF DESCRIPTION OF THE DRAWINGS

FIG. 8 shows an exemplary master ticket management table according to an embodiment;

FIG. 9 shows an exemplary SOAP message for calling a master ticket issuance method according to an embodiment;

FIG. 11 shows an exemplary SOAP message for calling a master ticket issuance method according to an embodiment;

FIG. 12 shows an exemplary master ticket management table according to an embodiment;

FIG. 13 shows an exemplary authentication information management table according to an embodiment;

FIG. 14 shows an exemplary SOAP message for calling an authentication ticket issuance method according to an embodiment;

FIG. 15 shows an exemplary SOAP message including response information of an authentication ticket issuance method according to an embodiment;

FIG. 19 shows an exemplary SOAP message for calling an authentication ticket issuance method using a master ticket registered in a master ticket management table according to an embodiment;

FIG. 20 shows an exemplary SOAP message including response information of an authentication ticket issuance method.

DETAILED DESCRIPTION OF THE PREFERRED EMBODIMENTS

Figure 1:
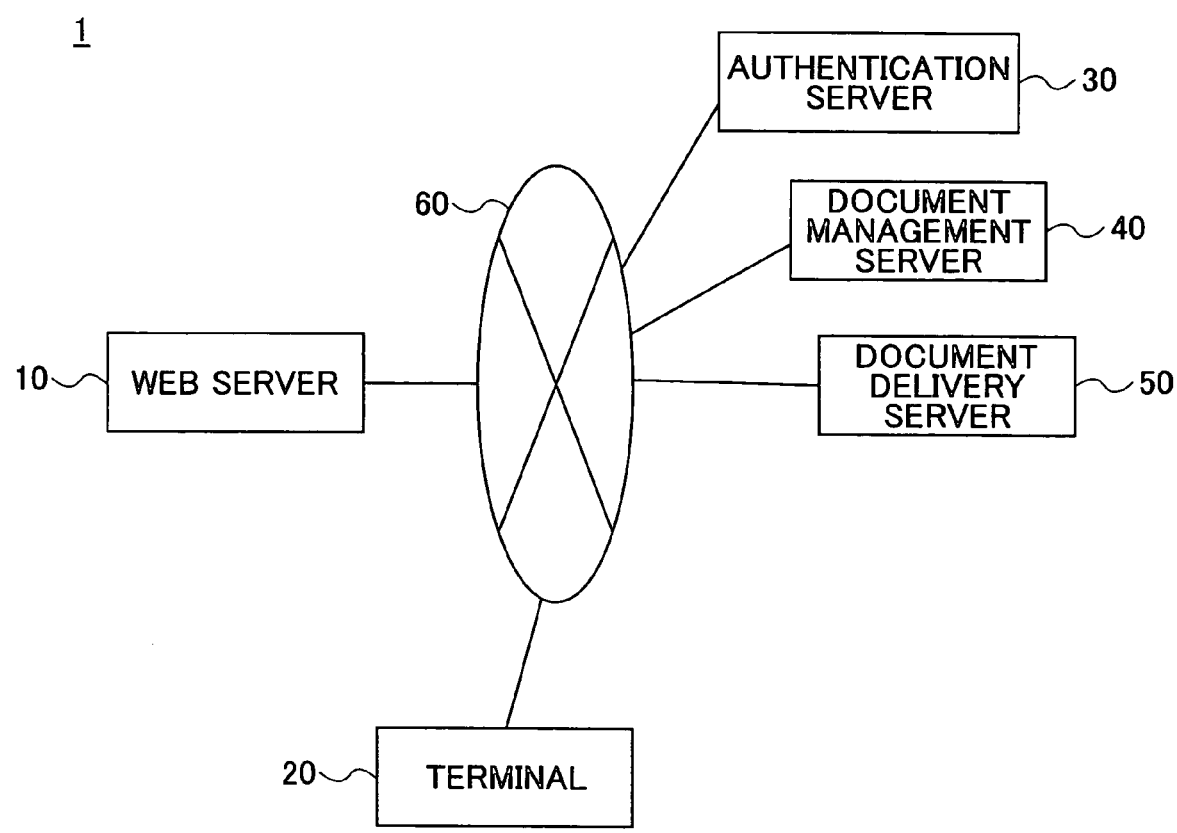
FIG. 1 is a network diagram showing a Web system according to an embodiment.

The preferred embodiments of the present invention are described in detail below with reference to the drawings. FIG. 1 is a network diagram showing a Web system according to an embodiment of the present invention. As shown in FIG. 1, a Web system 1 includes a Web server 10, a terminal 20, an authentication server 30, a document management server 40, and a document delivery server 50. They are connected to each other via a network 60 such as the Internet and a LAN.

The Web server 10 is a computer that is capable for providing the terminal 20 with a Web page in which information requested by the terminal 20 is displayed. A Web page is data in the form of HTML or XML, for example, that a general purpose Web browser can display. When providing the Web page to the terminal 20, the Web server 10 uses the authentication server 30, the document management server 40, and the document delivery server 50, for example, on necessity basis.

The terminal 20 is a communication terminal such as a personal computer (PC), a personal digital assistant (PDA), or a cellular phone, which is provided with a Web browser. The user can browse the Web page provided by the Web server 10 with the browser.

The authentication server 30 is a computer that authenticates (authentication function) Web system 1 users based on their user names and passwords, for example. The authentication server 30 makes the authentication function available via the network 60 as a Web service (authentication service).

The document management server 40 is a computer in which a document database for managing document information is provided. The document management server 40 registers, retrieves, and updates document information (document management functions), and make the document management functions available via the network 60 as a Web service (document management service).

The document delivery server 50 delivers document data (document delivery function), and this document delivery function is made available via the network 60 as a Web service (document delivery service). The document data selected by the terminal 20 is delivered to a destination designated by the terminal 20.

The authentication server 30, the document management server 40, and the document delivery server 50 provide their functions as Web services, which can be called by RPC of SOAP. Accordingly, the three servers may be collectively referred to as a "SOAP server".

Figure 2:
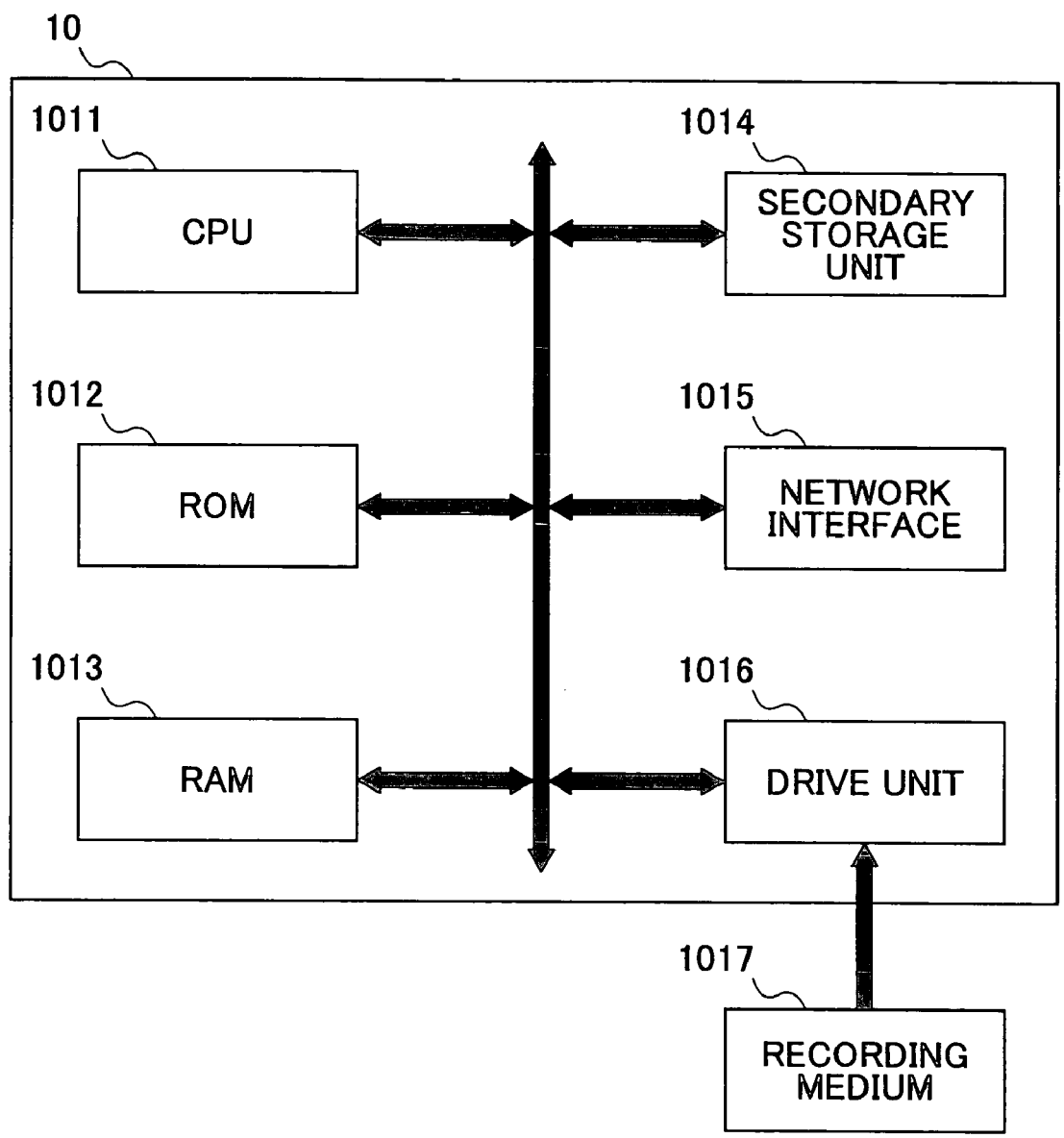
FIG. 2 is a block diagram showing the hardware structure of a Web server according to an embodiment.

The Web server 10 is described in detail below. FIG. 2 is a block diagram showing the hardware structure of the Web server 10 according to an embodiment. The Web server 10 includes CPU 1011, ROM 1012, RAM 1013, a secondary storage unit 1014, a network interface (I/F) 1015, and a drive unit 1016.

The CPU 1011 is a control unit for controlling the entire system of the Web server 10. The CPU 1011 executes various control programs and various application programs stored in the ROM 1012 and the secondary storage unit 1014 in order to control the Web server 10, control communications via the network 60, acquire and edit data, for example.

The ROM 1012 is a memory unit for mainly storing the control programs of the Web server 10. The RAM 1013 is a memory unit for temporally storing data as a working memory of the CPU 1011.

The secondary storage unit 1014 is a storage unit for storing various application programs and data. The network interface 1015 is an interface for connecting the Web server 10 to the network 60.

The drive unit 1016 is a drive unit for reading programs according to an embodiment stored in a recording medium 1017 such as a CD-ROM.

The Web server may be provided with an operation unit (not shown) such as a keyboard and a mouse for receiving instructions from the user, and a display unit (not shown) such as a liquid crystal display or a CRT display for displaying the results of operations.

The other SOAP servers may be configured in the same manner as the Web server 10 shown in FIG. 2. Programs for realizing the functions of the SOAP servers may be stored in a recording medium and can be provided. The SOAP server realizes the functions defined by the programs by reading the recording medium such as a CD-ROM with the drive unit 1016.

Figure 3:
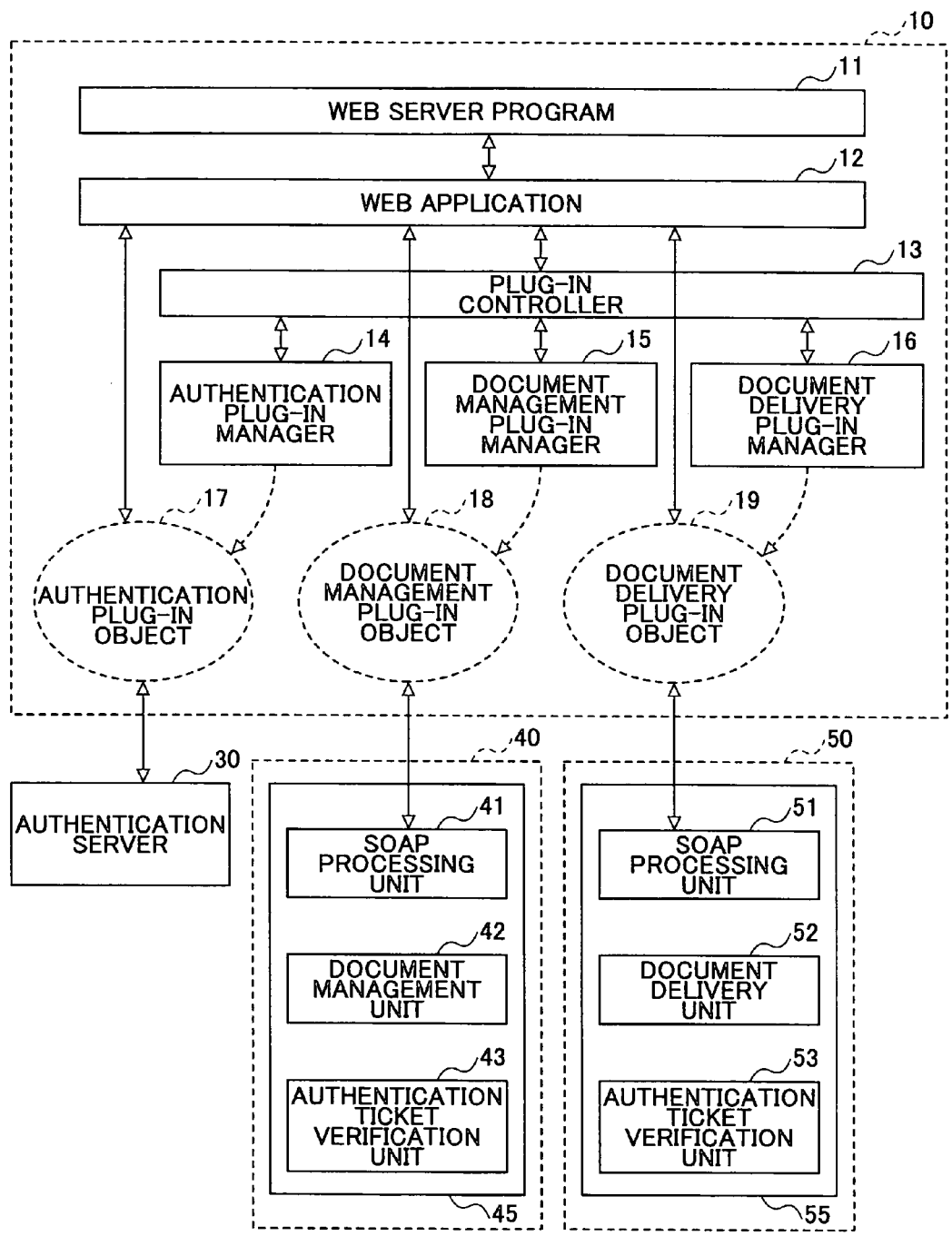
FIG. 3 is a schematic diagram showing the functional structure of a Web server according to an embodiment.

The functional configuration of the Web system 1 according to an embodiment is described below. FIG. 3 is a schematic diagram showing the functional configuration of the Web server 10. As shown in FIG. 3, the Web server 10 includes a Web server program 11, a Web application 12, a plug-in controller 13, an authentication plug-in manager 14, a document management plug-in manager 15, a document delivery plug-in manager 16, an authentication plug-in object 17, a document management plug-in object 18, and a document delivery plug-in object 19.

The Web server program 11 is a daemon program that receives various requests from the terminal 20 as HTTP requests using HyperText Transfer Protocol (HTTP), calls the Web application 12 corresponding to the request, and transmits the Web pages generated by the Web application 12 to the terminal 20.

The Web application 12 is a kind of Web applications. Its major function is to generates Web pages represented in HTML format, for example. When generating the Web pages, the Web application 12 acquires, if necessary, an authentication plug-in object 17, a document management plug-in object 18, or a document delivery plug-in object 19 (hereinafter correctively referred to as "plug-in object"), for example, via the plug-in controller 13. The Web application 12 can use the functions of various SOAP servers via such objects. The plug-in controller 13 is a module for providing common interface through which the Web application 12 can acquire various plug-in objects. That is, the plug-in controller 13 accepts requests for an object via the common interface (method) regardless the type of the object. For example, the plug-in controller 13 according to the embodiment accepts the request for an object by a method "getPlugin( )" (a plug-in acquiring method). Each Web application 12 acquires an object by calling the common plug-in acquiring method whatever the type of the object is.

The authentication plug-in manager 14, the document management plug-in manager 15, and the document delivery plug-in manager 16 manages the life cycles of plug-in objects based on the types of the plug-in objects. That is, the object manager has, for example, function for generating a corresponding plug-in object and function for discarding the corresponding plug-in object as methods.

The authentication plug-in object 17, the document management plug-in object 18, and the document delivery plug-in object 19 are provided for transparently providing the functions of the authentication server 30, the document management server 40, and the document delivery server 50, respectively, to the Web application 12 via method interface. In response to a call for the method from the Web application 12, the plug-in object provides the function of the SOAP server to the Web application 12 by calling the corresponding method using RPC of SOAP.

In the embodiment, a plug-in includes a plug-in manager and a plug-in object. For example, the plug-in (authentication plug-in) corresponding to the authentication server 30 includes the authentication plug-in manager 14 and the authentication plug-in object 17. Similarly, the plug-in (document management plug-in) corresponding to the document management server 40 includes the document management plug-in manager 15 and the document management plug-in object 18. The plug-in (document delivery plug-in) corresponding to the document delivery server 50 includes the document delivery plug-in manager 16 and the document delivery plug-in object 19.

Thus, if a new plug-in is to be added, for example, if the plug-in corresponding to a print server for printing document data, a print plug-in manager and a print plug-in object are to be installed.

a document management service 45 for managing documents (document management function) as a Web service is installed in the document management server 40. A document management service 45 includes a SOAP processing unit 41, a document management unit 42, and an authentication ticket verification unit 43. The SOAP processing unit 41 is a module that receives a SOAP message including information for calling the method transmitted by the document management plug-in 17, and calls the requested method based on the SOAP message.

The document management unit 42 is a module in which various methods for providing the document management functions are installed. The methods installed in the document management unit 42 are called by the RPC of SOAP.

The authentication ticket verification unit 43 is a module for verifying the authenticity of an authentication ticket. The authentication ticket is data including information indicating that the user has been authenticated by the authentication server 30, or data including pointer information of the information. When the authentication server 30 authenticates the user based on the authentication information input by the user, the authentication server issues the authentication ticket.

A document delivery service 55 for delivering documents as a Web service is installed in the document delivery server 50. The document delivery service 55 includes a SOAP processing unit 51, a document delivery unit 52, and an authentication ticket verification unit 53. The SOAP processing unit 51 and the authentication ticket verification unit 53 have similar functions to the SOAP processing unit 41 and the authentication ticket verification unit 43, respectively, of the document management server 40. The document delivery unit 52 is a module in which various methods for delivering documents (document delivery function) are installed. That is, the RPC of SOAP calls the methods installed in the document delivery unit 52.

Figure 4:
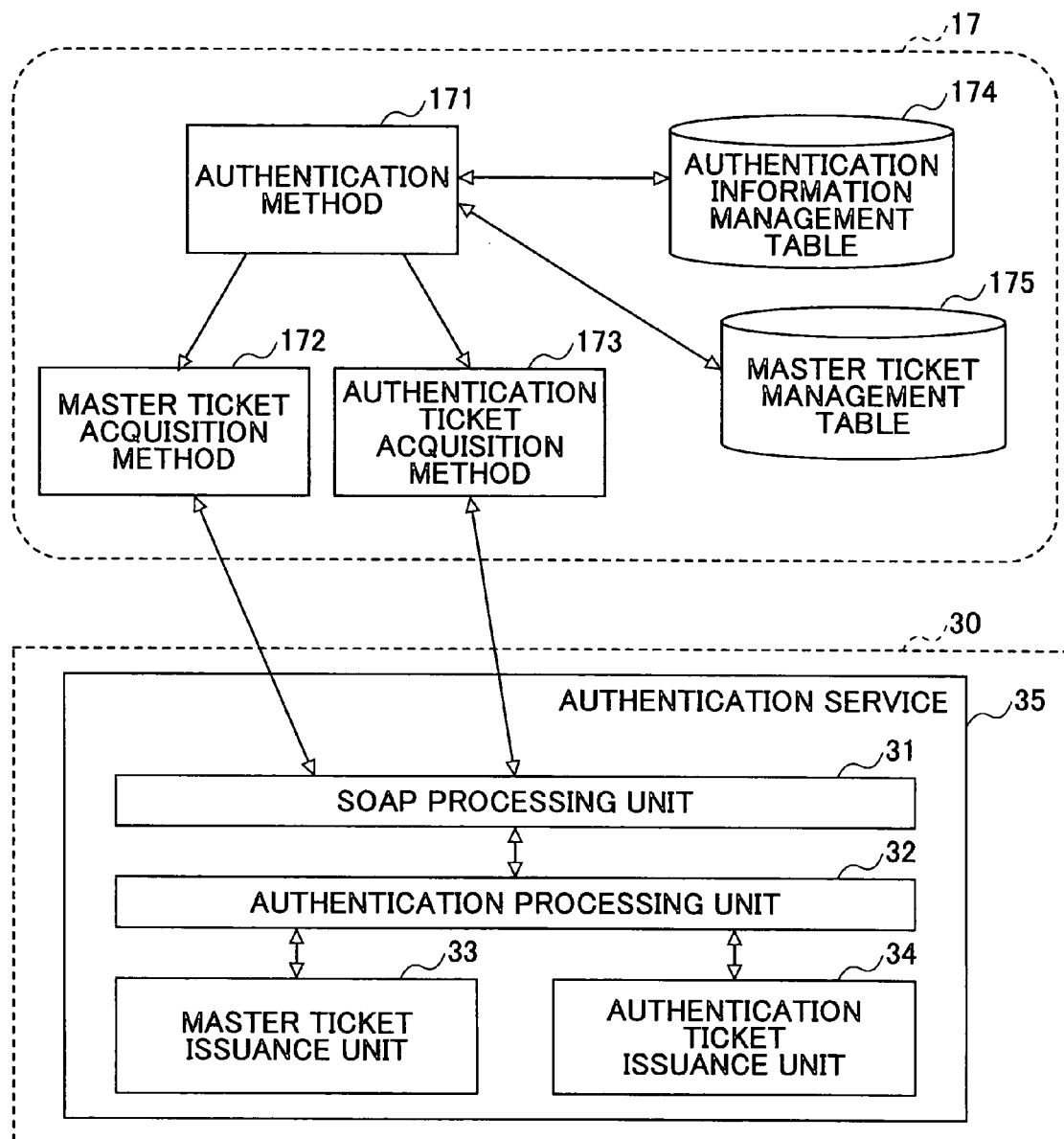
FIG. 4 is a schematic diagram for explaining the function of an authentication plug-in object and an authentication server according to an embodiment.

FIG. 4 is a functional block diagram showing the authentication plug-in object and the authentication server. As shown in FIG. 4, the authentication plug-in object 17 includes an authentication method 171, a master ticket acquisition method 172, an authentication ticket acquisition method 173, an authentication information management table 174, and a master ticket management table 175.

The authentication method 171 is a method for accepting a request for authentication based on the authentication information from the user. The authentication method 171 requests authentication requested by the plug-in controller 13 to the authentication server 30 by calling the master ticket acquisition method 172 or the authentication ticket acquisition method 173, for example. The authentication method 171 returns the authentication ticket issued as the result of the authentication to the authentication method 171. The authentication method 171 accepts the user name and the password related to the authentication request as parameters.

The master ticket acquisition method 172 is a method that acquires the master ticket from the authentication server 30 by transmitting to the authentication server 30 a request for the authentication based on the user name and the password designated as the parameters of the authentication method 171.

The master ticket is data that indicates that the user is authenticated by the authentication server 30 as the authentication ticket is, but both tickets are different in usage.

The authentication ticket is valid in a limited range such as in a single SOAP server. For example, an authentication ticket that is issued for the document management server 40 cannot be used by other SOAP servers. The authentication ticket verification unit of a SOAP server does not accept any authentication ticket that is not issued for the SOAP server. Accordingly, if the authentication ticket is stolen, the owner of the authentication ticket may fail to prevent the SOAP server for which the authentication ticket has been issued from being accessed. The person who has stolen the authentication ticket cannot access any SOAP server other than the SOAP server for which the authentication ticket has been issued.

On the other hand, the master ticket is a ticket valid for all SOAP servers that accept authentication using a ticket. The user can obtain an authentication ticket by presenting the master ticket. Accordingly, if the master ticket is stolen, the owner of the master ticket cannot prevent the entire system that accepts authentication using a ticket from being accessed by an unauthorized user who has stolen the master ticket.

The two different types of tickets are defined so as to improve the security of network. The authentication ticket is defined for preventing the master ticket from being transmitted often via the network. According to this arrangement, the master ticket needs to be used only on limited occasions such as the issuing of an authentication ticket based on the request of the master ticket owner.

The authentication ticket acquisition method 173 is a method for acquiring an authentication ticket from the authentication server 30 by transmitting a request for the issuance of the authentication ticket to the authentication server 30 using the master ticket that the master ticket acquisition method 172 has obtained from the authentication server 30.

The authentication information management table 174 is a table for retaining authentication information of a user such as a password input by the user. The master ticket management table 175 is a table for retaining a master ticket acquired by the master ticket acquisition method 172.

On the other hand, an authentication service 35 is installed in the authentication server 30. The authentication service 35 provides authentication function as Web service. The authentication service 35 includes a SOAP processing unit 31, an authentication processing unit 32, a master ticket issuance unit 33, and an authentication ticket issuance unit 34.

The SOAP processing unit 31 is a similar module to the SOAP processing unit of other SOAP servers such as the document management server 40. The authentication processing unit 32 is a module in which authentication function for users based on their authentication information is installed. The authentication processing unit 32 accepts a request for using the authentication function via a method interface. That is, the method installed in the SOAP processing unit 31 is called by the RPC of SOAP.

The master ticket issuance unit 33 is a module for generating a master ticket for a user who is authenticated by the authentication processing unit 32. The authentication ticket issuance unit 34 is a module for generating an authentication ticket based on the master ticket.

Figure 5:
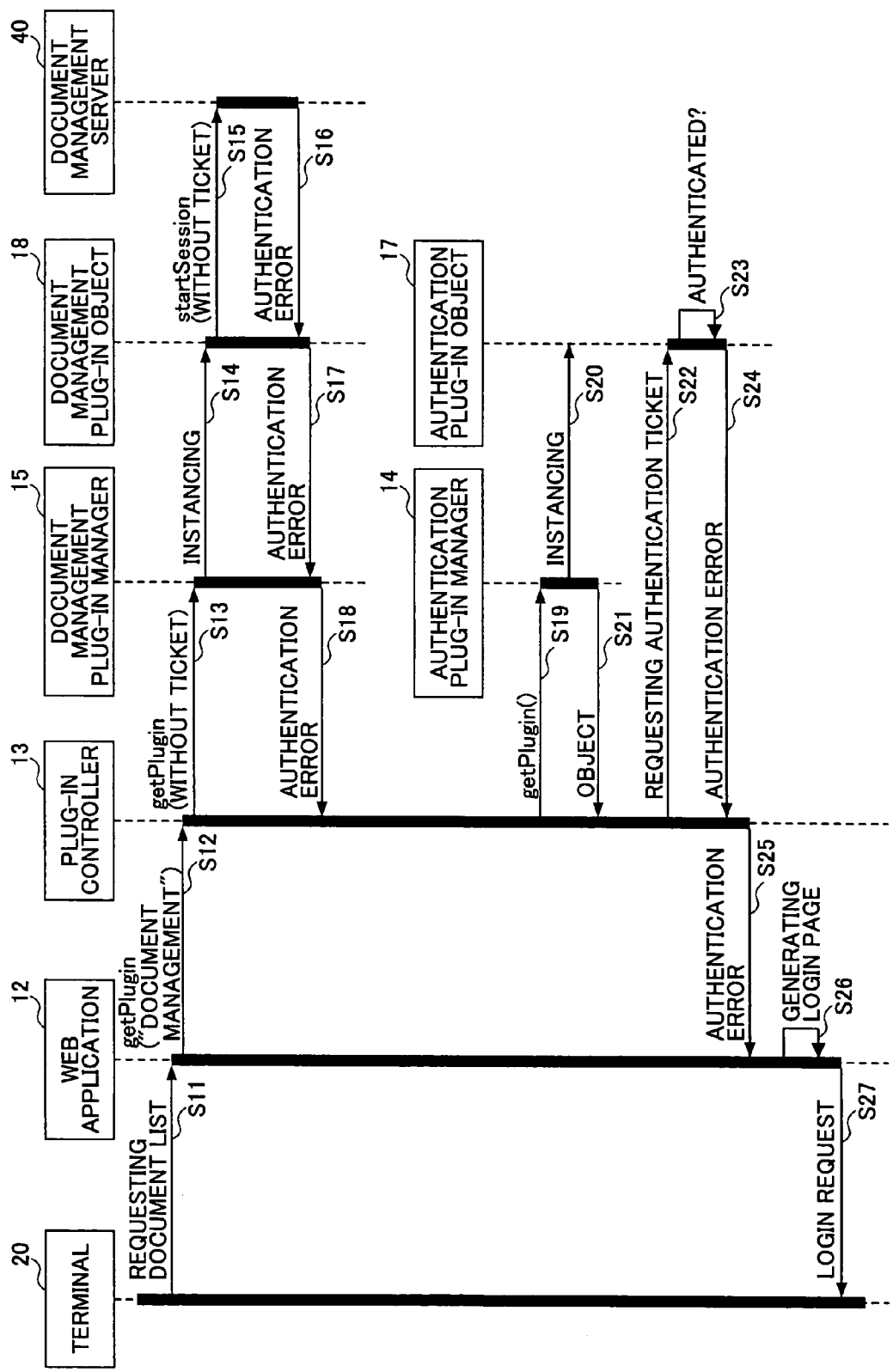
FIG. 5 is a sequence diagram for explaining authentication processing of a Web system according to an embodiment.
Figure 6:
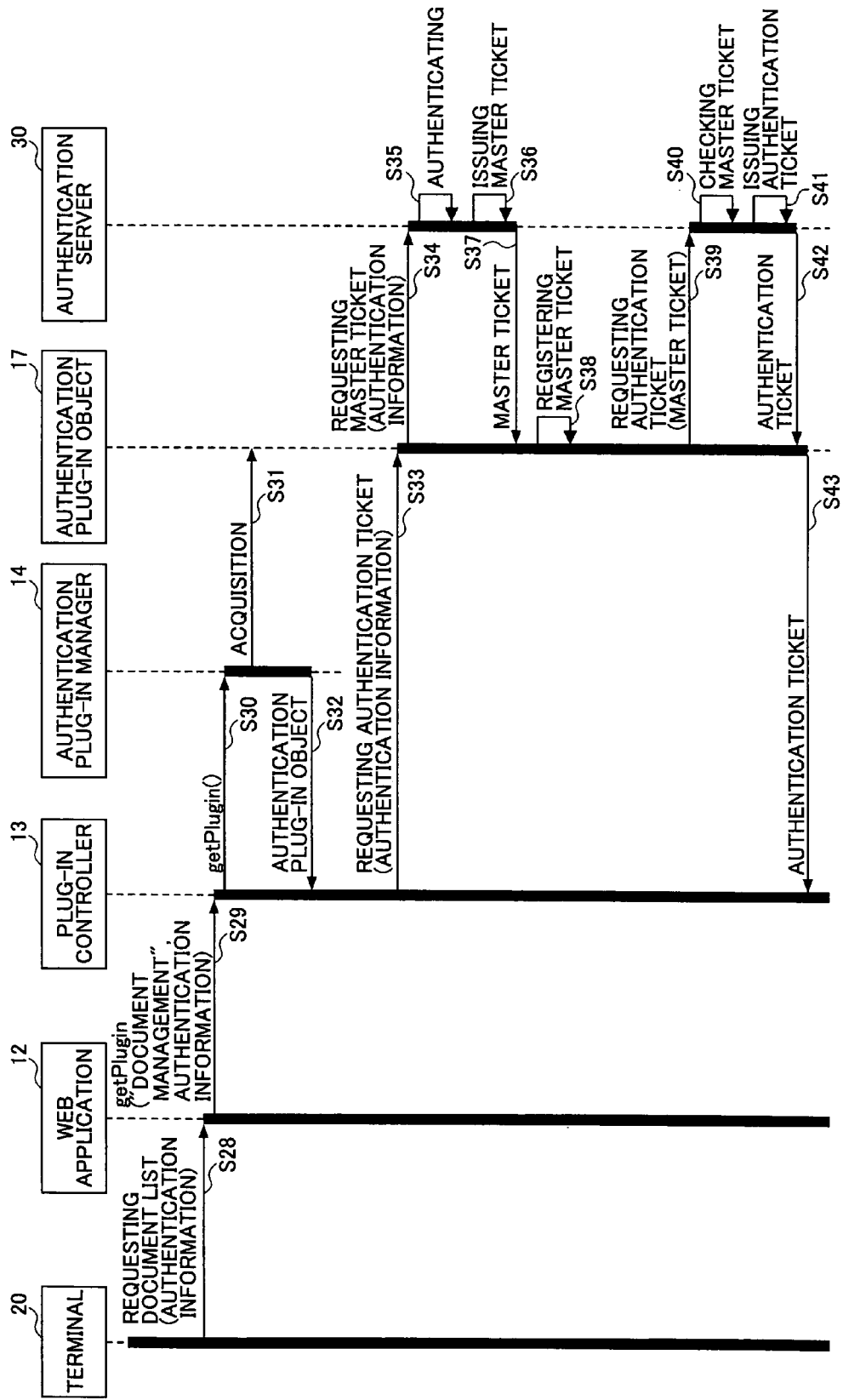
FIG. 6 is a sequence diagram for explaining authentication processing of a Web system according to an embodiment.
Figure 7:
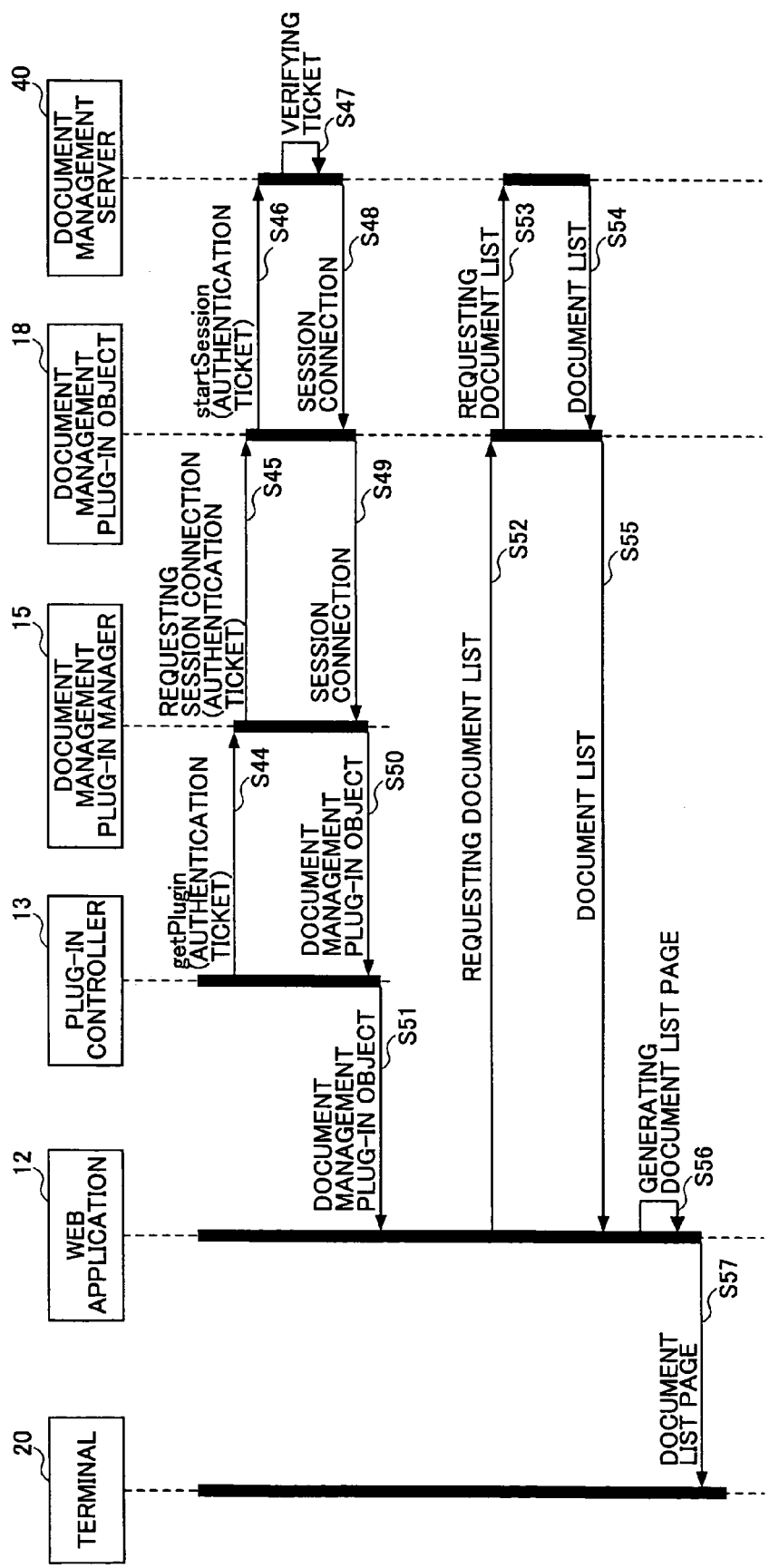
FIG. 7 is a sequence diagram for explaining authentication processing of a Web system according to an embodiment.

The processing steps performed by the Web system 1 are described below. FIGS. 5, 6, and 7 are sequence diagrams for explaining the authentication of a user who uses the Web system for the first time. It is noted that the "user who uses the Web system for the first time" is a user who intends to use the functions of the document management server 40 and/or the document delivery server 50, for example, but has not been authenticated by the authentication server 30 yet.

Using the Web browser of the terminal 30, the user inputs a URL of a Web page (hereinafter referred to as "document list page") in which document list information is displayed in order to browse the list information (hereinafter referred to as "document list information") of document data managed by the document management server 40. In response to the user's input, the terminal 30 transmits a HTTP request for requesting the transmission of a document list page to the Web server 10 (S11).

In the Web server 10, the Web application 12 is called by the Web server program 11 that has received the HTTP request from the terminal 30. The Web application 12 needs to acquire the document management plug-in object 18 in order to obtain the document list information. The Web application 12 requests the plug-in controller 13 to provide the document management plug-in object 18 by calling a plug-in acquisition method (getPlugin( )) of the plug-in controller 13 (S12). A plug-in name ("document management" in this case) that indicates the type of the plug-in object to be acquired is designated as the parameter of the plug-in acquisition method.

The plug-in controller 13 determines the type of plug-in in which the requested plug-in object (document management plug-in object 18) is included based on the plug-in name designated as the parameter of the plug-in acquisition method. The plug-in controller 13 requests the plug-in manager to provide the plug-in object by calling the plug-in acquisition method (getPlugin( )) of the plug-in manager (document management plug-in object manager 14) of the plug-in.

An authentication ticket may be designated as the parameter of the plug-in acquisition method of the plug-in manager. However, no authentication ticket is designated as the parameter in this case. As will be appreciated, the authentication ticket designated as the parameter is used for establishing a session with the document management server 40. Some SOAP servers, however, may not need the authentication of the user for establishing a session. Thus, it is worth to try establishing a session with the document management server 40 before obtaining user authentication (without authentication ticket).

In step S14 subsequent to step S13, the document management plug-in manager 15 converts the document management plug-in object 18 into an instance. After being converted into an instance, the document management plug-in object requests the document management server 40 to establish a session by calling a session establishment method (startSession( )) of the document management server 40 using the RPC of SOAP (S15). It is possible to designate the authentication ticket as the parameter of the session establishment method. However, as described above, no authentication ticket is designated as the parameter.

In the present embodiment, the document management server 40 is installed in a manner in which only an authenticated user can access the document management server 40. That is, the authentication ticket verification unit 53 of the document management server 40 is designed to verify the authenticity of the authentication ticket that may be designated as the parameter of the session establishment method. However, in this case, no authentication ticket is designated as the parameter of the session establishment method. As a result, the document management server 40 transmits a message that, since the user has not been authenticated, the document management server cannot establish a session (authentication error) to the document management plug-in object 18 as response information of the session establishment method (S16).

The authentication error is returned from the document management plug-in object 18 to the plug-in controller 13 via the document management plug-in manager 15 (S17, S18).

In response to receipt of the authentication error, the plug-in controller 13 determines that the authentication ticket is needed for using the document management server 40. As a result, the plug-in controller 13 requests (getPlugin( )) the authentication plug-in manager 14 to provide the authentication object in order to have the authentication server 30 to issue the authentication ticket (S19).

The authentication plug-in manager 14 converts the authentication plug-in object 17 into an instance (S20), and returns the authentication plug-in object 17 to the plug-in controller 13 (S21).

The plug-in controller 13 requests the authentication plug-in object 17 to issue the authentication ticket for the document management server 40 by calling an authentication method 171 of the authentication plug-in object 17 (S22). It is possible to designate the authentication information such as the user name and password of the user. However, since the user has not input the authentication information yet at this stage. As a result, the plug-in controller 13 calls the authentication method 171 without designating the authentication information as a parameter.

The plug-in controller 13 calls the authentication method 171 without requesting the user to input the user's authentication information and designating the authentication information as the parameter. The reason is that, as will be appreciated, if the current user has an experience of acquiring an authentication ticket, the current user may successfully acquire the authentication ticket without designated the authentication information as the parameter of the authentication method.

In step S23, since no authentication information is designated as the parameter of the authentication method, the authentication plug-in object 17 determines whether the current user has an experience of being authenticated by referring to the master ticket management table 175.

FIG. 8 shows an exemplary master ticket management table. As shown in FIG. 8, the master ticket management table 175 includes data items corresponding to an ID, a master ticket, and a URL of the authentication service, for example, and is used for retaining master tickets that have been issued for users.

The ID is a number for uniquely identifying each record. The master ticket is the master ticket itself that has been issued. The authentication service URL is a URL for the authentication service of the authentication server that has issued the master ticket.

At this stage, since the user has not been authenticated by the authentication server 30 yet, no master ticket has been registered in the master ticket management table 175. As a result, the authentication method 171 of the authentication plug-in object 17 returns a message that the authentication ticket cannot be issued for the user (authentication error) to the plug-in controller 13 (S24).

The plug-in controller 13 returns the authentication error to the Web application 12 as response information of the plug-in acquisition method called in step S12 (S25).

In response to receipt of the authentication error, the Web application 12 determines that the Web application 12 needs to request the user to input the authentication information, and generates a Web page (hereinafter referred to as "log-in page") through which the user can input the user name and password (S26). The log-in page is transmitted from the Web application 12 to the terminal 20 via the Web server program 11, and is displayed by the Web browser of the terminal 20 (S27).

If the user inputs the authentication information such as the user name and password through the log-in page, the terminal 20 transmits a request (HTTP request) for transmitting the document list page to the Web server 10 again with the authentication information (FIG. 6, S28).

The Web application 12 requests the plug-in controller 13 to provide the document management plug-in object 17 by calling the plug-in acquisition method of the plug-in controller 13 in the same manner as step S12 (S29). In this case, the authentication information received from the terminal 20 is designated as the parameter of the plug-in acquisition method.

Since the authentication information is designated as the parameter of the plug-in acquisition method, the plug-in controller 13 requests the authentication plug-in manager 14 to provide the authentication plug-in object 17 by calling the plug-in acquisition method of the authentication plug-in manager 14 (S30). The authentication plug-in manager 14 acquires the authentication plug-in object 17 converted into an instance in step S20 (S31), and returns the authentication plug-in object 17 to the plug-in controller 13 (S32).

The plug-in controller 13 requests for the authentication ticket for the document management server 40 again by calling the authentication method 171 of the authentication plug-in object 17 (S33). It is noted that the authentication information received from the terminal 20 is designated as the parameter of the authentication method this time.

Since the authentication information is designated as the parameter, the authentication method 171 calls the master ticket acquisition method 172 to acquire the master ticket required for having an authentication ticket issued. The master ticket acquisition method 172 transmits a request (SOAP message) for authentication and issuance of the master ticket based on the authentication information to the authentication server 30 by calling the master ticket issuance method of the authentication processing unit 32 of the authentication server 30 using the RPC of SOAP (S34).

FIG. 9 shows an exemplary SOAP message for calling the master ticket issuance method. In the SOAP message 61 of FIG. 9, a portion indicated by a reference numeral 611 is information for calling the master ticket issuance method. The tag name "authenticateByPassword" of a tag 612 is the method name of the master ticket issuance method. Descriptions 613, 614, and 615 indicate the parameter of the master ticket issuance method. The descriptions 613 and 614 correspond to the user name and the password, respectively. The description 615 corresponds to the validity period (the unit being minutes) of the requested master ticket.

In step S35 subsequent to step S34, the master ticket issuance method of the authentication processing unit 32 is called by the SOAP processing unit 31 that has received the SOAP message 61 (FIG. 9). The authentication processing unit 32 authenticates the current user based on the authentication information such as the user name and password designated as the parameter of the master ticket issuance method.

If the current user is authenticated, a master ticket issuance unit 33 generates the master ticket for the current user based on a request from the authentication processing unit 32 (S36).

Figure 10:
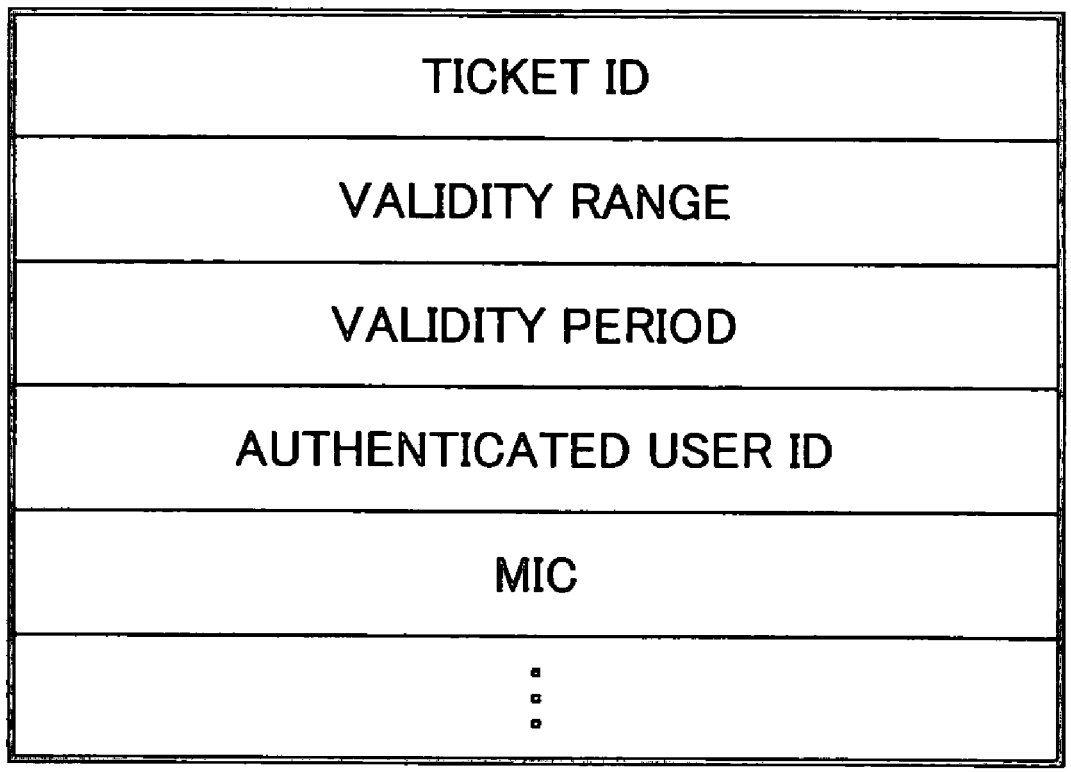
FIG. 10 is a data diagram showing the data structure of a master ticket according to an embodiment.

FIG. 10 is a data diagram showing the exemplary data structure of the master ticket. As shown in FIG. 10, the master ticket includes a ticket ID, validity range, validity period, authenticated user ID, and MIC.

The ticket ID is a code for uniquely identifying the issued ticket. The validity range is information for identifying either the master ticket or the authentication ticket, and in the case of the authentication ticket, the range in which the authentication ticket can be used. That is, if the ticket is the master ticket, the entry of the validity range is "master". If the ticket is the authentication ticket, a domain name or a server name, for example, is recorded as the entry of the validity range in order to identify the range in which the authentication ticket can be used.

The validity period is a period in which an authentication ticket can be issued based on the ticket. The validity period is determined based on the validity period designated as the parameter of the authentication method. An expired ticket is invalid. According to this arrangement, damage caused by a stolen master ticket can be prevented from expanding unlimitedly.

The authentication user ID is a user ID of an authenticated user. The MIC is a code for verifying that the ticket has not been altered on its way.

In step S37 subsequent to step S36, the authentication processing unit 32 outputs the master ticket generated by the master ticket issuance unit 33 to the SOAP processing unit 31 as response information of the master ticket issuance method. Then, the SOAP processing unit 31 serializes the master ticket, and transmits a SOAP message including the serialized master ticket as response information to the authentication plug-in object 17.

FIG. 11 shows an exemplary SOAP message including response information of the master ticket issuance method. In the SOAP message 62 of FIG. 11, a portion indicated by a reference numeral 621 is the response information. That is, a character string between <returnValue> tags in a description 622 is the serialized master ticket.

In step S38 subsequent to step S37, the authentication method 171 of the authentication plug-in object 17 registers the master ticket received from the authentication server 30 in the master ticket management table 175, and further registers the authentication information such as the user name and password input through the log-in page in the authentication information management table 174.

FIG. 12 shows an exemplary master ticket management table in which a master ticket has been registered. As shown in FIG. 12, the contents of the master ticket and the URL of the authentication server 30 that has issued the master ticket.

FIG. 13 shows an exemplary authentication information management table. As shown in FIG. 13, the authentication information management table 174 includes data items such as an ID, the user name, the password, and an authentication service URL.

The ID is a number for uniquely identifying each record, and is the same value as the corresponding record in the master ticket management table 175. That is, the ID is used for correlating the record of the authentication information management table 174 and the record of the master ticket management table 175.

The user name and password are those of the authenticated user. The authentication service URL is a URL of the authentication service of the authentication server 30 that has issued the master ticket, and carries the same value as the corresponding record of the master ticket management table 175.

According to the present embodiment, the record of the authentication information management table 174 and the record of the master ticket management table 175 correspond one to one. As a result, information of both tables may be managed by a single table.

In step S39 subsequent to step S38, the authentication method 171 calls the authentication ticket acquisition method 173 by designating the master ticket acquired in step S37 as the parameter in order to have an authentication ticket issued. In response to the call, the authentication ticket acquisition method 173 transmits a request (SOAP message) for issuing the authentication ticket to the authentication server 30 by calling the authentication ticket issuance method of the authentication processing unit 32 of the authentication server 30 using the RPC of SOAP.

FIG. 14 shows an exemplary SOAP message for calling the authentication ticket issuance method. In the SOAP message 63 of FIG. 14, a portion indicated by a reference numeral 631 is call information for the authentication ticket issuance method. That is the tag name "createAuthTicket" of a tag 632 is the method name of the authentication ticket issuance method. Descriptions 633, 634, and 635 are parameter information of the authentication ticket issuance method. The description 633 corresponds to the master ticket. The description 634 corresponds to validity period (the unit being minutes) of the requested authentication ticket. The description 635 corresponds to a validity range of the requested authentication ticket.

In step S40 subsequent to step S39, in response to receipt of the SOAP message (FIG. 14), the SOAP processing unit 31 calls the authentication ticket issuance method of the authentication processing unit 32. The authentication processing unit 32 verifies the authenticity of the master ticket designated as the parameter of the authentication ticket issuance method. The authenticity of the master ticket is verified by determining that the master ticket has not been expired and is not altered, for example.

Once the authenticity of the master ticket is verified, the authentication ticket issuance unit 34 generates an authentication ticket based on the master ticket in response to a request from the authentication processing unit 32 (S41). The authentication ticket may have the same data structure as the master ticket shown in FIG. 10. According to another embodiment, the authentication ticket may be pointer information of user information managed by the authentication server 30.

The authentication processing unit 32 outputs the authentication ticket generated by the authentication ticket issuance unit 34 to the SOAP processing unit 31 as response information of the authentication ticket issuance method. In response to the output, the SOAP processing unit 31 serializes the authentication ticket, and transmits a SOAP message including the serialized authentication ticket as response information to the authentication plug-in object 17 (S42).

FIG. 15 shows an exemplary SOAP message including response information of the authentication ticket issuance method. In the SOAP message 64 of FIG. 11, a portion indicated by a reference numeral 641 is the response information. A character string between <returnValue> tags indicated by a reference numeral 642 is the serialized authentication ticket.

In step S43 subsequent to step S42, the authentication method 171 returns a de-serialized authentication ticket to the plug-in controller 13 as response information.

Following the above steps, the plug-in controller 13 acquires the authentication ticket for the document management server 40 for the current user. Then, the plug-in controller 13 requests the document management plug-in manager 15 to provide the document management plug-in object 18 by calling the plug-in acquisition method (getPlugin( )) of the document management plug-in manager 15 again using the acquired authentication ticket as the parameter (FIG. 7, S44).

The document management plug-in manager 15 requests the document management plug-in object 18 converted into an instance in step S14 to establish a session with the document management server 40 using the authentication ticket as the parameter (S45). The document management plug-in object 18 calls the session establishment method (startSession( )) of the document management server 40 using the authentication ticket issued based on the master ticket as the parameter by the RPC of SOAP (S46).

In the document management server 40, the authentication ticket verification unit 43 determines, for example, whether the current user being the owner of the authentication ticket is permitted to access the document management server 40 by verifying the authentication ticket designated as the parameter of the session establishment method (S47).

Once a determination is made that the current user is permitted to access the document management server 40, the document management unit 42 of the document management server 40 establishes a session, and transmits a message that a session has been established to the document management plug-in object 18 as response information of the session establishment method (S48).

The document management plug-in object 18 returns a message that a session has successfully established to the document management plug-in manager 15 (S49). In response to receipt of the message, the document management plug-in manager 15 outputs the document management plug-in object 18 to the plug-in controller 13 (S50). The document management plug-in object 18 is returned to the Web application 12 as response information of the plug-in acquisition method called in step S29 (S51).

The Web application 12 acquires the document management plug-in object 18, and requests the document management plug-in object 18 to acquire the document list information (S52). The document management plug-in object 18 request the document management server 40 to transmit the document list information by calling the document list acquisition method of the document management unit 42 of the document management server 40 using the RPC of SOAP (S53).

The document management unit 42 acquires the document list information, and transmits the document list information to the document management plug-in object 18 as response information of the document list acquisition method (S54).

The document management plug-in object 18 returns the received document list information to the Web application 12 (S55). In response, the Web application 12 generates the document list page for displaying the document list information (S56). The document list page is transmitted from the Web application 12 to the terminal 20 via the Web server program 11, and displayed by the Web browser of the terminal 20 (S57).

According to the above process, the authentication information and master ticket of the user has been retained in the authentication information management table 174 or the master ticket management table 175 using the document management service of the Web system 1.

Next, the operation of the Web system 1 in the case in which the user uses a service other than the document management service is described below.

Figure 16:
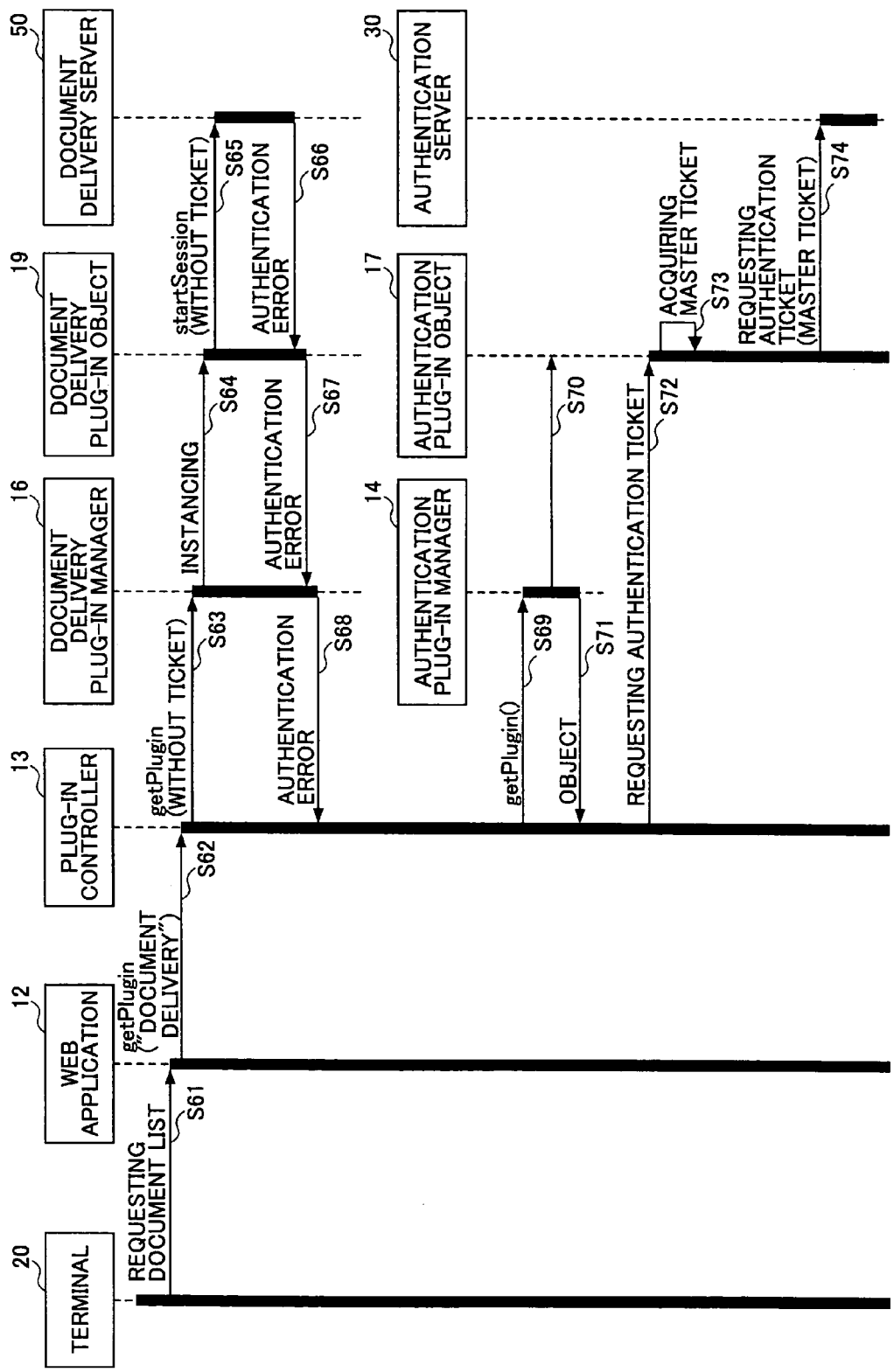
FIG. 16 is a sequence diagram for explaining authentication processing in response to a user's request for another service according to an embodiment.
Figure 17:
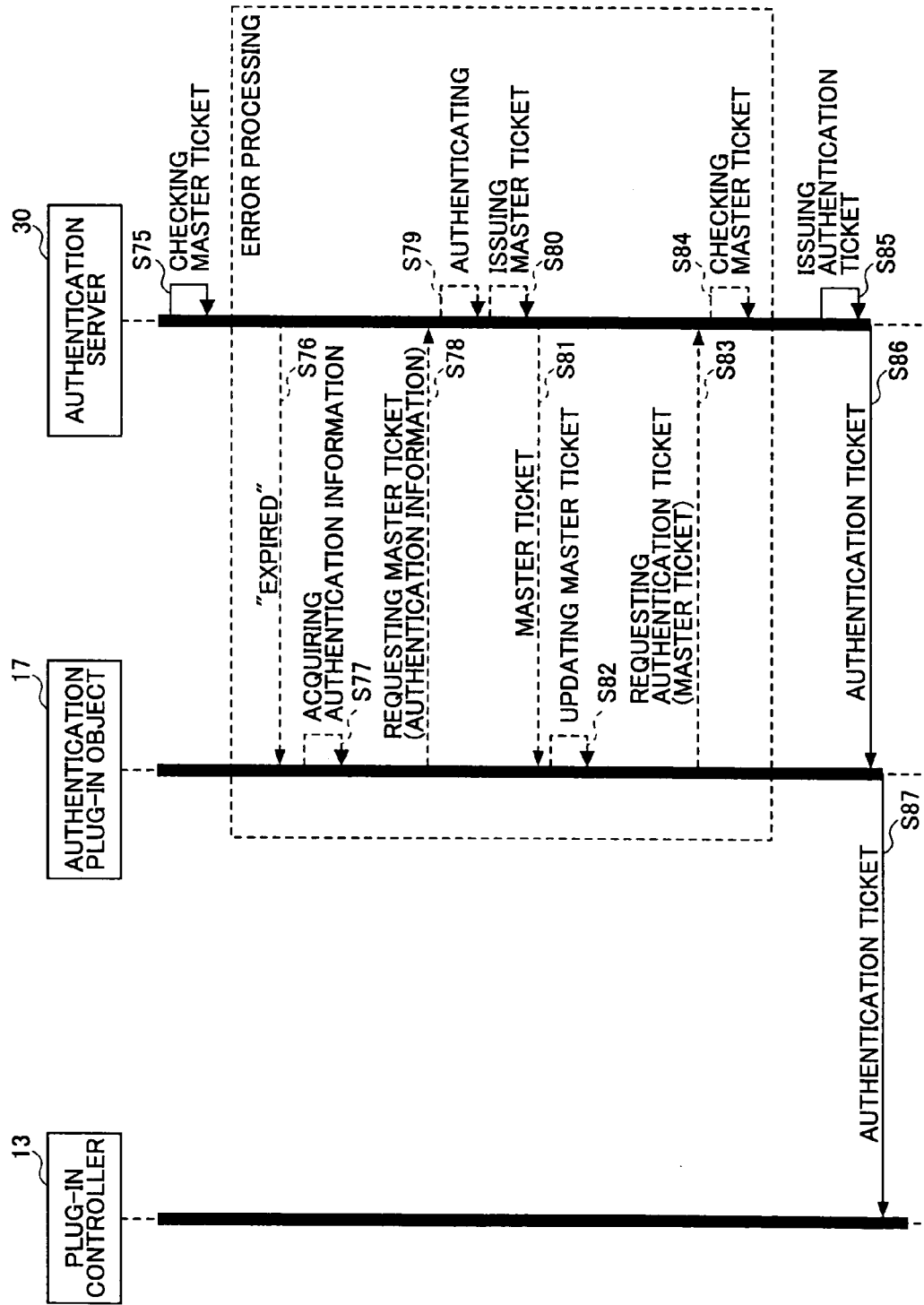
FIG. 17 is a sequence diagram for explaining authentication processing in response to a user's request for another service according to an embodiment.
Figure 18:
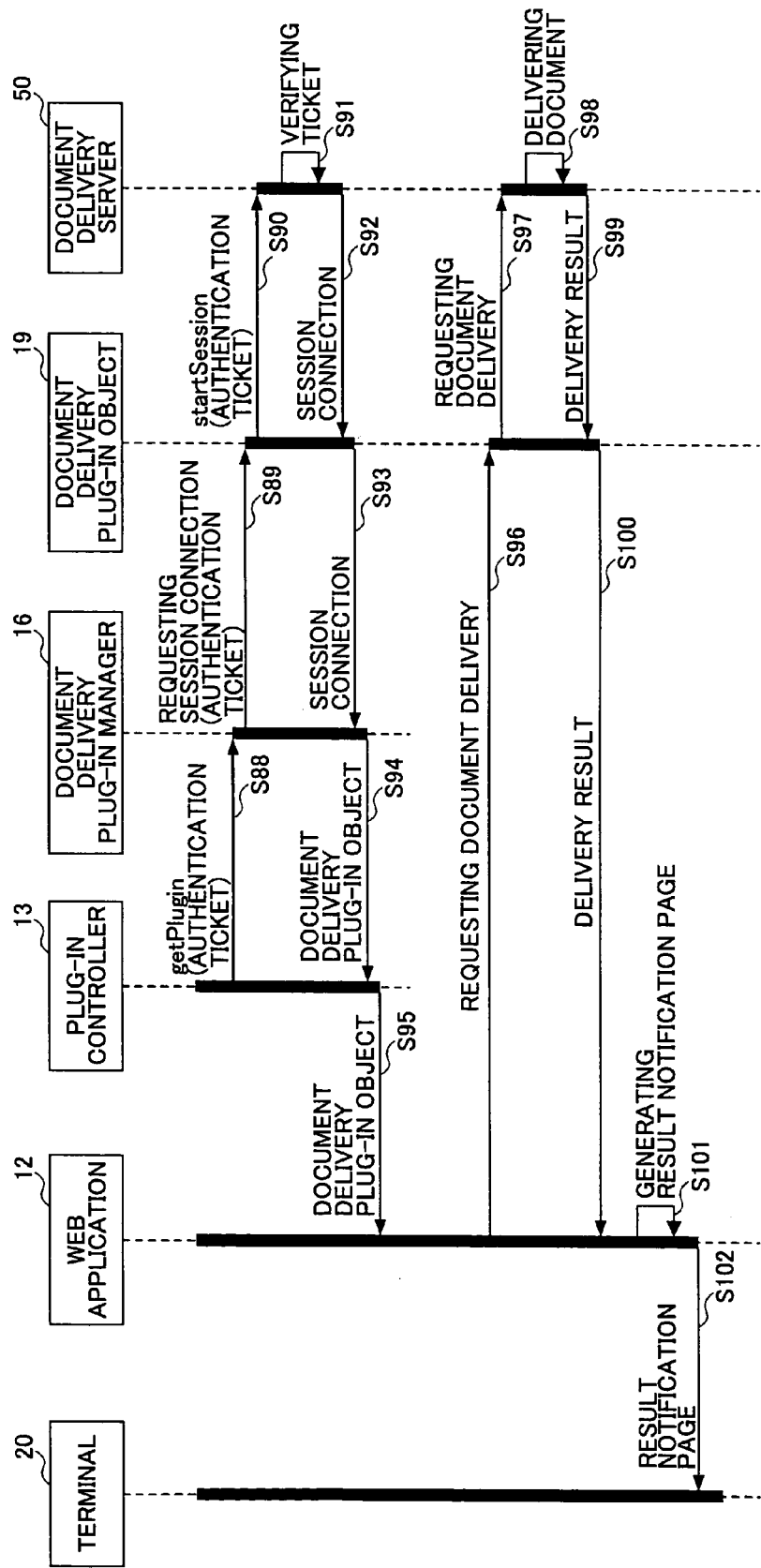
FIG. 18 is a sequence diagram for explaining authentication processing in response to a user's request for another service according to an embodiment.

FIGS. 16 through 18 are sequence diagrams for explaining authentication processing in the case in which the user requests for another service.

The user requests for delivery of document data through the document list page displayed by the Web browser of the terminal 20. In response to the user's request, the terminal 30 transmits a HTTP request for requesting the Web server 10 to deliver the document data (S61).

In the Web server 10, in response to receipt of the HTTP request from the terminal 20, the Web server program 11 calls the Web application 12. It is necessary to acquire a document delivery plug-in object 19 for the document delivery server 50 to deliver the document data. The Web application 12 designates the plug-in name ("document delivery") of the document delivery plug-in as the parameter, and calls the plug-in acquisition method (getplugin( )) of the plug-in controller 13 (S62).

The plug-in controller 13 calls the plug-in acquisition method of the document delivery plug-in manager 16 without designating the authentication ticket as the parameter in the same manner in which the document management plug-in object 18 has been acquired (FIG. 5, S13). The plug-in controller 13 does not care whether the current user has been authenticated (S63).

The document delivery server 50 is installed in the same manner as the document management server 40 in which only authenticated users have access thereto. Accordingly, steps S64 through S72 are identical to steps S14 through S22.

That is, the document delivery plug-in object 19 is made into an instance (S64). The document delivery plug-in object 19 requests for establishing a session with the document delivery server 50 (S65). In response to the request, the document delivery server 50 returns the authentication error (S66). The authentication error is returned to the plug-in controller 13 via the document delivery plug-in manager 16 (S67, S68).

Since the plug-in controller 13 acquires the authentication ticket, the plug-in controller can acquire authentication plug-in object 17 (S69 through S71). The plug-in controller 13 requests the authentication plug-in object 17 to issue an authentication ticket for the document delivery server 50 by calling the authentication method 171 of the authentication plug-in object 17 without designating the authentication information as the parameter (S72).

The authentication method 171 acquires the master ticket from the master ticket management table 175 (FIG. 12) (S73). Since the master ticket management table 175 retains the master ticket issued retained as described above, the master ticket retained in the master ticket management table 175 is used.

The authentication method 171 calls the authentication ticket acquisition method 173 with designating the master ticket acquired from the master ticket management table 175 as the parameter in order to have the authentication ticket issued. In response to calling, the authentication ticket acquisition method 173 transmits a request (SOAP message) for issuing the authentication ticket to the authentication server 30 by calling the authentication ticket issuance method of the authentication processing unit 32 of the authentication server 30 using the RPC of SOAP (S74).

FIG. 19 shows an exemplary SOAP message for calling the authentication ticket issuance method using the master ticket registered in the master ticket management table. The SOAP message 65 of FIG. 19 is configured in the same manner as the SOAP message 63 in FIG. 14. Accordingly, its detailed description is omitted.

In step S75 subsequent to step S74, the authentication processing unit 32 of the authentication server 30 verifies the authenticity of the master ticket designated as the parameter of the authentication ticket issuance method in the same manner as step S40 (FIG. 6). If the master ticket is verified as being authentic, the process proceeds to step S85 in which the authentication ticket issuance unit 34 generates an authentication ticket for the current user.

However, the master ticket may have expired. In such a case, the verification of the authenticity of the master ticket is not achieved, and steps S75 through S84 are performed.

That is, the verification processing unit 32 transmits a message that the master ticket has already expired to the authentication plug-in object 17 as response information of the authentication ticket issuance method (S76). The authentication plug-in object 17 acquires the authentication information of the current user from the authentication information management table 174 in order to have the master ticket being issued (S77), and calls the master ticket issuance method of the authentication processing unit 32 of the authentication server 30 using the RPC of SOAP by designating the authentication information as the parameter (S78). The master ticket is issued in the same manner as steps S35 through S37 (FIG. 6) (S79 through S81).

In step S82, the authentication method 171 of the authentication plug-in object 17 updates the expired master ticket registered in the master ticket management table 175 with the newly acquired master ticket. The authentication method 171 of the authentication plug-in object 17 calls the master ticket issuance method using the RPC of SOAP designating the newly acquired master ticket as the parameter (S83).

The authentication processing unit 32 of the authentication server 30 verifies the authenticity of the master ticket (S84). If the authenticity is verified, error processing ends, and the authentication ticket issuance unit 34 generates the authentication ticket in the same manner as step S75 in which the authenticity of the master ticket is verified (S85).

In step S86 subsequent to step S85, the authentication processing unit 32 outputs the authentication ticket generated by the authentication ticket issuance unit 34 to the SOAP processing unit 31 as response information of the authentication ticket issuance method. The SOAP processing unit 31 serialized the authentication ticket, and transmits a SOAP message including the serialized authentication ticket as response information to the authentication plug-in object 17.

FIG. 20 shows an exemplary SOAP message including response information of the authentication ticket issuance method. The SOAP message 66 of FIG. 20 is configured in the same manner as the SOAP message 64 of FIG. 15. Thus, its detailed description is omitted.

In step S87 subsequent to step S86, the authentication method 171 returns the de-serialized authentication ticket to the plug-in controller 13 as response information.

As a result of the above process, the plug-in controller 13 has acquired the authentication ticket for the document delivery server 50 for the current user. Then, the plug-in controller 13 requests the document delivery plug-in manager 16 to provide the document delivery plug-in object 19 by calling the plug-in acquisition method (getplugin( )) of the document delivery plug-in manager (S88). The process from step S88 to S102 is basically identical to the process from step S44 to S57 (FIG. 7) except for the fact that the document delivery service (document delivery server 30) is the service to be used.

The document delivery plug-in manager 16 requests the document delivery plug-in object 19 made into an instance in step S64 to establish a session with the document delivery server 50 using the authentication ticket as the parameter (S89). The document delivery plug-in object 19 calls the session establishment method (startSession( )) of the document delivery server 50 designating the authentication ticket issued based on the master ticket retained in the master ticket management table 175 as the parameter using the RPC of SOAP (S90).

In the document delivery server 50, the authentication ticket verification unit 53 determines whether, for example, the current user being the owner of the authentication ticket is permitted to use the document delivery server 50 by verifying the authentication ticket designated as the parameter of the session establishment method (S91).

It is noted that in the case in which the account of the current user for the document delivery server 50 is generated under the same user name as the account for the document management server 40, the user who has been authenticated for the document management server 40 would be probably authenticated for the document delivery server 50.

If the current user is verified to be permitted to use the document delivery server 50, the document delivery unit 52 of the document delivery server 50 establish a session, and transmits a message that the session has been established to the document delivery plug-in object 19 as response information of the session establishment method (S92) The document delivery plug-in object 19 returns the message that the session has successfully established to the document delivery plug-in manager 16 (S93). The document delivery plug-in object 19 is returned from the document delivery plug-in manager 16 to the Web application 12 via the plug-in controller 13 (S94, S95).

In response to acquisition of the document delivery plug-in object 19, the Web application 12 requests the document delivery plug-in object 19 to deliver the document data (S96). The document delivery plug-in object 19 requests the document delivery server 50 to deliver the document data by calling the document delivery method of the document delivery unit 52 of the document delivery server 50 using the RPC of SOAP (S97).

The document delivery unit 52 delivers the document data (S98), and transmits information related to the result of the delivery of the document data (hereinafter referred to as "delivery result information") to the document delivery plug-in object 19 as response information of the document delivery method (S99).

The document delivery plug-in object 19 returns the received delivery result information to the Web application 12 (S100). In response to the returning, the Web application 12 generates a Web page (hereinafter referred to as "result notification page") for displaying the delivery result information (S101). The result notification page is transmitted from the Web application 12 to the terminal 20 via the Web server program 11, and is displayed by the Web browser of the terminal 20 (S102).

In step S91, in the case of the accounts of the current user for both servers are different, even if the user is authenticated for the document management server 40, the authentication of the user for the document delivery server 50 may be rejected. Thus, the log-in page is transmitted to the terminal 20 again to request the user to input the authentication information for the document delivery server 50. If the user inputs the authentication information for the document delivery server 50, the same steps as those from step S28 (FIG. 6) are performed. As a result, a new master ticket is issued based on the input authentication information, and an authentication ticket is issued based on the issued master ticket. The user can use the document delivery server 50 with the authentication ticket. If another request for using the SOAP server is made afterward, the master ticket issued for the use of the document management server 40 and the master ticket issued for the use of the document delivery server 50 are used for authentication one by one.

As described above, in the case of the Web system 1 according to an embodiment, the authentication information used for the issuing of the master ticket in the past is retained in the authentication information management table 174.

According to this arrangement, even if the master ticket expires, and a new master ticket needs to be issued, it is not necessary to request the user to input the authentication information again.

If the user has been using the function of the document management server 40 and intends to additionally use the function of the document delivery server 50, the authentication of the document delivery server 50 is performed based on the authentication information input for the use of the function of the document management server 40 and the master ticket issued based on the authentication information. According to this arrangement, the user does not need to input the authentication information again. The user does not need to spend time to input the authentication information again.

According to the present embodiment, two types of tickets, the master ticket and the authentication ticket, are used. However, even if only the master ticket is used, the same effect as that of the present embodiment can be realized.

Recently, embedded systems dedicated for specific purposes that function as Web servers, for example, in the same manner as a computer does are provided. An image processing apparatus called a multi function peripheral (MFP) having multiple functions such as printing, copying, and facsimile is a kind of the embedded system. The recently available image processing apparatuses may function as Web servers, and store (document management function) document data that are copied, or received as facsimile messages.

Figure 21:
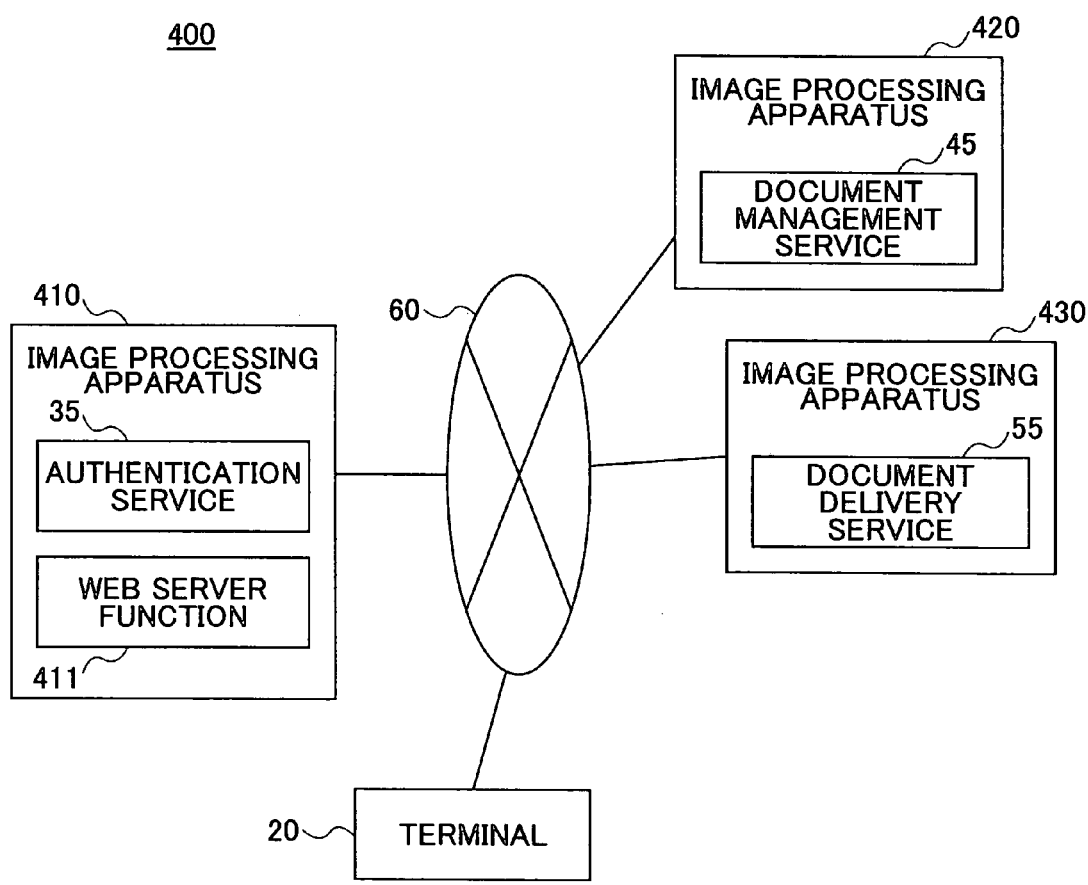
FIG. 21 is a network diagram showing a Web system configured by image processing apparatuses according to an embodiment.

Accordingly, if the Web system 1 according to the present embodiment is configured with such image processing apparatuses, the same effect can be realized. FIG. 21 is a network diagram showing the configuration of a Web system in which such image processing apparatuses are used. In FIG. 21, the same components as those of FIG. 1 are referred to by the same reference numerals, and their description is omitted.

Compared with the Web system 1 of FIG. 1, a Web system 400 of FIG. 21 includes image processing apparatuses 410, 420, and 430 instead of the Web server 10, the authentication server 30, the document management server 40, and the document delivery server 50.

The image processing apparatus has Web server function 411 corresponding to the functions installed in the Web server 10, that is, the Web server program 11, the Web application 12, the plug-in controller 13, the plug-in managers, the plug-in objects, for example, and the authentication service 35 installed in the authentication server 30.

The image processing apparatus has the same document management service 45 as the document management server 40. The image processing apparatus 430 has the same document delivery service 55 as the document delivery server 50. As a result, the image processing apparatus 410 functions in the same manner as the Web server 10 and the authentication server do. The image processing apparatus 420 functions in the same manner as the document management server 40 does. The image processing apparatus 430 functions in the same manner as the document delivery server 50 does. The Web system 400 according to an embodiment can realize the effect of the present invention in the same manner as the Web system 1.

The document management function and the document delivery function are closely associated with the image processing apparatus. All the functions may be installed in each image processing apparatus, rather than being distributed to the multiple image processing apparatuses.

The preferred embodiments of the present invention are described above. The present invention is not limited to these embodiments, but variations and modifications may be made without departing from the scope of the present invention.

This patent application is based on Japanese priority patent application No. 2003-291046 filed on Aug. 11, 2003, the entire contents of which are hereby incorporated by reference.

What is claimed is:

1. An information processing apparatus including a hardware processor and memory, the apparatus using functions of a plurality of external apparatuses using certificate information from an authentication apparatus for authenticating a user, the information processing apparatus comprising:
   a receiving unit that receives authentication information for causing the authentication apparatus to authenticate the user;
   a first acquiring unit that acquires a master ticket, the master ticket indicating that the user has been authenticated by sending the authentication information to the authentication apparatus, wherein the master ticket allows the user to access all the plurality of external apparatuses that permit access with the master ticket; and
   a second acquiring unit that acquires an authentication ticket that allows the user to access a particular one of the plurality of external apparatuses from the authentication apparatus based on the master ticket, the authentication ticket having a period of validity, wherein the master ticket allows continued use of the a function of the particular one of the plurality of external apparatuses even in case the period of validity of the authentication ticket is expired.

2. The information processing apparatus as claimed in claim 1, further comprising:
   a certification information retaining unit that retains the master ticket and information indicating the location of the authentication apparatus based on identification information for uniquely identifying the master ticket and the information indicating the location of the authentication apparatus that issues the master ticket.

3. The information processing apparatus as claimed in claim 1, wherein the master ticket acquired by the first acquiring unit is valid at least for a validity period in which the authentication ticket is acquirable.

4. The information processing apparatus as claimed in claim 1, wherein
   the authentication ticket is needed to use the function of the external apparatus; and
   the function of the external apparatus becomes usable by using the authentication ticket.

5. The information processing apparatus as claimed in claim 2, further comprising:
   an authentication information retaining unit that retains the authentication information;
   wherein if the first acquiring unit receives a notification indicating that the master ticket has been expired as a result of a determination by the authentication apparatus whether the master ticket is still valid, the first acquiring unit acquires a new master ticket from the authentication apparatus based on the authentication information retained in the authentication information retaining unit.

6. The information processing apparatus as claimed in claim 5, wherein the authentication information retaining unit further retains identification information for uniquely identifying the authentication information; and
   the authentication information and the information retained by the certification information retaining unit are associated to each other using the identification information.

7. The information processing apparatus as claimed in claim 6, wherein the certification information retaining unit and the authentication information retaining unit retains the same identification information.

8. An authentication apparatus including a hardware processor and memory, comprising:
an authentication unit that receives authentication information for authenticating a user, the authentication information being sent via a network from the information processing apparatus as claimed in claim 1;
a first certification information generating unit that generates a master ticket indicating that the user has been authenticated based on the authentication information; and
a transmitting unit that transmits the master ticket generated by the first certification information generating unit to the information processing apparatus.

9. The authentication apparatus as claimed in claim 8, further comprising:
a second certification information generating unit that generates an authentication ticket for permitting the information processing apparatus to use functions of the external apparatus based on the master ticket received from the information processing apparatus.

10. The authentication apparatus as claimed in claim 8, wherein the master ticket generated by the first certification information generating unit includes a validity period in which the authentication ticket can be generated.

11. The authentication apparatus as claimed in claim 9, wherein when the authenticating unit receives a request for acquiring the authentication ticket using the master ticket from the information processing apparatus, the authenticating unit checks a validity period of the master ticket, and if the master ticket is still valid, causes the second certification information generating unit to generate an authentication ticket.

12. The authentication apparatus as claimed in claim 8, wherein when the authenticating unit receives a request for acquiring the authentication ticket using the master ticket from the information processing apparatus, the authenticating unit checks a validity period of the master ticket, and if the master ticket is no more valid, transmits a notification indicating that the master ticket is no more valid.

13. An external apparatus including a hardware processor and memory, comprising:
a request receiving unit that receives via a network a request for providing a predetermined function, the request being transmitted with the authentication ticket from the information processing apparatus as claimed in claim 1; and
a processing performing unit that performs processing related to the request for providing a predetermined function;
wherein the processing performing unit performs processing related to the request based on the authentication ticket even if the period of validity of the master ticket expires.

14. The external apparatus as claimed in claim 13, further comprising:
a certification information verifying unit that verifies the authenticity of the authentication ticket.

15. A method of acquiring certification information in an information processing apparatus having a hardware processor and memory, the information processing apparatus using functions of a plurality of external apparatuses using certificate information from an authentication apparatus for authenticating a user, the method comprising the steps of:
receiving authentication information for causing the authentication apparatus to authenticate the user by using the hardware processor;
acquiring a master ticket, the master ticket indicating that the user has been authenticated by transmitting the authentication information to the authentication apparatus, wherein the master ticket allows the user to access all the plurality of external apparatuses;
acquiring an authentication ticket that allows the user to access a particular one of the plurality of external apparatuses based on the master ticket from the authentication apparatus, the authentication ticket having a period of validity; and
permitting use of a function of the particular one of the plurality of external apparatuses based on the master ticket, even in case the period of validity of the authentication ticket is expired.

16. The method as claimed in claim 15,
retaining the master ticket and location information indicating a location of the authentication apparatus that has issued the master ticket in a predetermined memory region based on identification information for uniquely identifying the master ticket and the location information.

17. The method as claimed in claim 15,
wherein
the master ticket acquired in the step of acquiring a first certification information includes at least a validity period in which the authentication ticket can be acquired.

18. The method as claimed in claim 15,
wherein the authentication ticket is for using the function of the external apparatus; and
the information processing apparatus uses the function of the external apparatus using the authentication ticket.

19. The method as claimed in claim 15, further comprising the step of:
retaining the authentication information in a predetermined memory region;
wherein in the step of acquiring a master ticket, if notification that the master ticket has expired as a result of determination by the authentication apparatus of whether the master ticket is still valid, a new master ticket is acquired from the authentication apparatus based on the authentication information retained in the predetermined memory region.

20. The method as claimed in claim 19,
wherein in the step of retaining the authentication information, the authentication information is retained being associated with the master ticket and the location information retained in the step of retaining.

21. The method as claimed in claim 20,
wherein the same identification information is used in the step of retaining the master ticket and location information and the step of retaining the authentication information.

22. A method of authenticating a user using a computer having a hardware processor and memory, the method comprising the steps of:
receiving authentication information for authenticating a user transmitted from the information processing apparatus as claimed in claim 1 via a network;
authenticating the user related to the authentication information by using the hardware processor;
generating a master ticket indicating that the user has been authenticated based on the authentication information; and transmitting the generated master ticket to the information processing apparatus.

23. The method as claimed in claim 22, further comprising the step of:

generating an authentication ticket that permits the information processing apparatus to use a function of the external function.

24. The method as claimed in claim 23, wherein the master ticket generated in the step of generating includes a validity period in which the authentication ticket can be generated.

25. The method as claimed in claim 23, wherein in the step of generating the authentication ticket, a step of determining whether the master ticket is still valid is performed, and if the master ticket is still valid, a certification information is generated.

26. The method as claimed in claim 23, wherein in the step of generating the authentication ticket, a step of determining whether the master ticket is still valid is performed, and if the master ticket has expired, a message indicating the determination is transmitted to the information processing apparatus.

27. A method of providing a function using a computer having a hardware processor and memory, the method comprising the steps of:

receiving a request for providing a function from the information processing apparatus as claimed in claim 1 via a network, the request accompanied by the authentication ticket; and performing processing related to the received request based on the authentication ticket accompanying the request by the hardware processor, even in case the period of validity of the master ticket is expired.

28. The method as claimed in claim 27, further comprising the step of:

determining authenticity of the authentication ticket.

29. A computer readable recording medium that contains a computer program that causes an information processing apparatus having a hardware processor and memory, the information processing apparatus using functions of a plurality of external apparatuses using certification information issued by an authentication apparatus for authenticating a user to perform the steps of:

receiving authentication information for causing the authentication apparatus to authenticate the user by the hardware processor;

acquiring a master ticket, the master ticket indicating that the user has been authenticated by transmitting the authentication information to the authentication apparatus, wherein the master ticket allows the user to access all the plurality of external apparatuses;

acquiring an authentication ticket that allows the user to access a particular one of the plurality of external apparatuses based on the master ticket from the authentication apparatus, the authentication ticket having a period of validity; and permitting use of the a function of the particular one of the plurality of external apparatuses based on the master ticket, even in case the period of validity of the authentication ticket is expired.

30. A computer readable recording medium that contains a computer program for authenticating a user that causes a computer having a hardware processor and memory to perform the steps of:

receiving authentication information for authenticating the user transmitted from the information processing apparatus as claimed in claim 1 via a network;

authenticating the user related to the authentication information;

generating a master ticket indicating that the user has been authenticated based on the authentication information by using the hardware processor; and transmitting the generated master ticket to the information processing apparatus.

31. A computer readable recording medium that contains a computer program for providing a function that causes a computer having a hardware processor and memory to perform the steps of:

receiving a request for providing a function from the information processing apparatus as claimed in claim 1 via a network, the request accompanied by the authentication ticket; and performing processing related to the received request based on the authentication ticket accompanying the request by the hardware processor even in case the period of validity of the master ticket expires.

* * * * *